(12) United States Patent
Lin et al.

(10) Patent No.: US 7,949,064 B2
(45) Date of Patent: May 24, 2011

(54) CODEBOOK AND PRE-CODER SELECTION FOR CLOSED-LOOP MIMO

(75) Inventors: Che Lin, Savoy, IL (US); Eko Nugroho Onggosanusi, Allen, TX (US); Anand Ganesh Dabak, Plano, TX (US); Badri Varadarajan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 811 days.

(21) Appl. No.: 11/893,045

(22) Filed: Aug. 13, 2007

(65) Prior Publication Data

US 2008/0037675 A1 Feb. 14, 2008

Related U.S. Application Data

(60) Provisional application No. 60/822,343, filed on Aug. 14, 2006.

(51) Int. Cl.
*H04B 7/02* (2006.01)
(52) U.S. Cl. ..................... 375/267
(58) Field of Classification Search .............. 375/267, 375/299, 347, 349, 358, 262; 700/53; 455/69, 455/101, 132–141
See application file for complete search history.

(56) References Cited

U.S. PATENT DOCUMENTS

| 2005/0031044 A1 | 2/2005 | Gesbert et al. |
| 2006/0056531 A1 | 3/2006 | Li et al. |
| 2006/0092054 A1* | 5/2006 | Li et al. ............ 341/67 |

OTHER PUBLICATIONS

Li et al. Soft Detection with Linear Precoding for Spatial Multiplexing Systems, 2006, IEEE, p. 2558-2562.*
Love et al., "Limited Feedback Unitary Precoding for Spatial Multiplexing Systems," IEEE Trans. on Inf. Theory, vol. 51, No. 8, pp. 2967-2976, (Aug. 2000).
Zhou et al., "BER Criterion and Codebook Construction for Finite-Rate Precoded Spatial Multiplexing With Linear Receivers," IEEE Trans. on Signal Processing, vol. 54, No. 5, pp. 1653-1665 (May 2006).
Li et al., "Compact Feedback for MIMO-OFDM Systems over Frequency Selective Channels," Vehicular Tech. Conf. 2005, VTC 2005 (Spring 2005).
Intel Corp., "Codebook Design for Precoded MIMO," 3GPP TSG RAN WGI #42, R1-060672 (Feb. 17, 2006).

* cited by examiner

*Primary Examiner* — Sam K Ahn
(74) *Attorney, Agent, or Firm* — Ronald O. Neerings; Wade James Brady, III; Frederick J. Telecky, Jr.

(57) ABSTRACT

A method of transmitting a communication signal (FIG. 1) is disclosed. The method includes receiving a data signal (102). The method further includes receiving a codeword index (pre-coder selection) from a remote transceiver. A codeword is selected from a Householder matrix based codebook in response to the index. The data signal is precoded (104) in response to the selected codeword. The precoded data signal is transmitted (100) to the remote transceiver.

35 Claims, 7 Drawing Sheets

HOUSEHOLDER CODEBOOK: 3 BITS $4 \times N_R \times 2$

| # | u | ROWS | # | u | ROWS |
|---|---|---|---|---|---|
| 1 | 0.1279<br>0.1931 + 0.7062i<br>0.4141 + 0.0971i<br>-0.4848 - 0.1780i | 1, 2 | 5 | 0.7638<br>-0.4549 - 0.0728i<br>0.1840 - 0.2426i<br>-0.3005 - 0.1460i | 1, 2 |
| 2 | 0.7036<br>0.3572 + 0.3960i<br>-0.2114 + 0.1660i<br>-0.3465 - 0.1681i | 1, 2 | 6 | 0.5258<br>0.4189 - 0.0920i<br>0.2730 - 0.6452i<br>-0.2153 - 0.0489i | 1, 2 |
| 3 | 0.4609<br>-0.1921 - 0.4021i<br>0.3019 - 0.5923i<br>0.2336 + 0.3042i | 1, 2 | 7 | 0.8727<br>0.1037 - 0.0732i<br>-0.0926 - 0.0393i<br>0.4306 + 0.1637i | 1, 2 |
| 4 | 0.2836<br>0.1579 - 0.6267i<br>0.3102 + 0.0489i<br>0.6299 - 0.0808i | 1, 2 | 8 | 0.4461<br>-0.4128 + 0.5348i<br>0.2484 + 0.4636i<br>0.1496 + 0.1652i | 1, 2 |

FIG. 7

HOUSEHOLDER CODEBOOK: 4 BITS $4 \times N_R \times 2$

| # | u | ROWS | # | u | ROWS |
|---|---|---|---|---|---|
| 1 | 0.2927<br>0.1298 + 0.6512i<br>-0.0335 - 0.5622i<br>0.1662 + 0.3586i | 1, 2 | 9 | 0.4326<br>-0.4304 + 0.0481i<br>0.6963 - 0.1860i<br>0.1500 + 0.2888i | 1, 2 |
| 2 | 0.5754<br>0.0530 + 0.2187i<br>-0.7569 + 0.1852i<br>0.0209 + 0.1035i | 1, 2 | 10 | 0.4225<br>-0.0582 - 0.3111i<br>-0.4713 - 0.1316i<br>-0.5823 - 0.3779i | 1, 2 |
| 3 | 0.4379<br>0.4527 - 0.0588i<br>-0.3630 - 0.3639i<br>-0.3692 + 0.4465i | 1, 2 | 11 | 0.6569<br>0.1485 - 0.0776i<br>-0.0998 - 0.4801i<br>0.5359 + 0.1125i | 1, 2 |
| 4 | 0.5062<br>-0.1806 - 0.1003i<br>0.6056 + 0.0988i<br>0.2603 - 0.5068i | 1, 2 | 12 | 0.7509<br>-0.4061 - 0.1814i<br>0.0274 + 0.2670i<br>0.0993 - 0.3954i | 1, 2 |
| 5 | 0.0774<br>-0.3019 - 0.1046i<br>-0.2880 + 0.8634i<br>0.2237 + 0.1160i | 1, 2 | 13 | 0.3816<br>0.5020 + 0.1775i<br>0.3039 - 0.5125i<br>0.4323 - 0.1702i | 1, 2 |
| 6 | 0.1056<br>-0.5156 + 0.2733i<br>-0.5343 - 0.2538i<br>-0.5021 + 0.2152i | 1, 2 | 14 | 0.6961<br>0.1961 + 0.5260i<br>-0.0002 - 0.0892i<br>-0.3517 + 0.2622i | 1, 2 |
| 7 | 0.3474<br>0.1465 - 0.4442i<br>0.6611 - 0.4650i<br>-0.0535 + 0.0662i | 1, 2 | 15 | 0.1991<br>0.0523 - 0.4184i<br>0.0165 + 0.4263i<br>0.1029 - 0.7681i | 1, 2 |
| 8 | 0.3585<br>0.0138 + 0.3114i<br>-0.0018 + 0.1268i<br>-0.7014 + 0.5160i | 1, 2 | 16 | 0.1471<br>-0.2071 - 0.4459i<br>0.2385 - 0.1701i<br>0.6400 + 0.4912i | 1, 2 |

FIG. 8

CODEBOOK AND PRE-CODER SELECTION FOR CLOSED-LOOP MIMO

CROSS-REFERENCES TO RELATED APPLICATIONS

This application claims the benefit, under 35 U.S.C. §119 (e)(1), of U.S. Provisional Application No. 60/822,343, filed Aug. 14, 2006, and incorporated herein by this reference.

BACKGROUND OF THE INVENTION

The present embodiments relate to communication systems and, more particularly, to codebook design and pre-coder selection for closed-loop Multiple-input Multiple-output (MIMO) communication systems.

Wireless communications are prevalent in business, personal, and other applications, and as a result the technology for such communications continues to advance in various areas. One such advancement includes the use of spread spectrum communications, including that of code division multiple access (CDMA) which includes wideband code division multiple access (WCDMA) cellular communications. In CDMA communications, user equipment (UE) (e.g., a hand held cellular phone, personal digital assistant, or other) communicates with a base station, where typically the base station corresponds to a "cell." CDMA communications are by way of transmitting symbols from a transmitter to a receiver, and the symbols are modulated using a spreading code which consists of a series of binary pulses. The code runs at a higher rate than the symbol rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. WCDMA includes alternative methods of data transfer, one being frequency division duplex (FDD) and another being time division duplex (TDD), where the uplink and downlink channels are asymmetric for FDD and symmetric for TDD. Another wireless standard involves time division multiple access (TDMA) apparatus, which also communicate symbols and are used by way of example in cellular systems. TDMA communications are transmitted as a group of packets in a time period, where the time period is divided into time slots so that multiple receivers may each access meaningful information during a different part of that time period. In other words, in a group of TDMA receivers, each receiver is designated a time slot in the time period, and that time slot repeats for each group of successive packets transmitted to the receiver. Accordingly, each receiver is able to identify the information intended for it by synchronizing to the group of packets and then deciphering the time slot corresponding to the given receiver. Given the preceding, CDMA transmissions are receiver-distinguished in response to codes, while TDMA transmissions are receiver-distinguished in response to time slots.

Wireless communications are degraded by the channel effect. For example, the transmitted signals are likely reflected by objects such as the ground, mountains, buildings, and other things that it contacts. Thus, when the transmitted communication arrives at the receiver, it has been affected by the channel effect as well as interference signals. Consequently, the originally-transmitted data is more difficult to decipher. Various approaches have been developed in an effort to reduce or remove the channel effect from the received signal so that the originally-transmitted data is properly recognized. In other words, these approaches endeavor to improve signal-to-interference+noise ratio (SINR), thereby improving other data accuracy measures (e.g., bit error rate (BER), frame error rate (FER), and symbol error rate (SER)).

One approach to improve SINR is referred to in the art as antenna diversity, which refers to using multiple antennas at the transmitter, receiver, or both. For example, in the prior art, a multiple-antenna transmitter is used to transmit the same data on each antenna where the data is manipulated in some manner differently for each antenna. One example of such an approach is space-time transmit diversity (STTD), also known as space-time block code (STBC). In STTD, a first antenna transmits a block of two input symbols over a corresponding two symbol intervals in a first order while at the same time a second antenna transmits, by way of example, the complex conjugates of the same block of two symbols and wherein those conjugates are output in a reversed order relative to how they are transmitted by the first antenna and the second symbol is a negative value relative to its value as an input.

Another approach to improve SINR combines antenna diversity with the need for higher data rate. Specifically, a Multiple-input Multiple-output (MIMO) system with transmit diversity has been devised, where each transmit antenna transmits a distinct and respective data stream. In other words, in a MIMO system, each transmit antenna transmits symbols that are independent from the symbols transmitted by any other transmit antennas for the transmitter and, thus, there is no redundancy of the transmitted signal over multiple transmit antennas. The advantage of a MIMO scheme using distinct and non-redundant streams is that it can achieve higher data rates as compared to a transmit diversity system.

MIMO system performance may be further improved by Orthogonal Frequency Division Multiplex (OFDM) transmission. With OFDM, multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver, and these tones are termed pilot tones or symbols. These pilot symbols can be useful for channel estimation at the receiver. An inverse fast Fourier transform (IFFT) converts the frequency domain data symbols into a time domain waveform. The IFFT structure allows the frequency tones to be orthogonal. A cyclic prefix is formed by copying the tail samples from the time domain waveform and appending them to the front of the waveform. The time domain waveform with cyclic prefix is termed an OFDM symbol, and this OFDM symbol may be upconverted to an RF frequency and transmitted. An OFDM receiver may recover the timing and carrier frequency and then process the received samples through a fast Fourier transform (FFT). The cyclic prefix may be discarded and after the FFT, frequency domain information is recovered. The pilot symbols may be recovered to aid in channel estimation so that the data sent on the frequency tones can be recovered. A parallel-to-serial converter is applied, and the data is sent to the channel decoder. Just as with HSDPA, OFDM communications may be performed in an FDD mode or in a TDD mode.

The use of MIMO systems has become a powerful technique to boost information rates and reliability of wireless communications at low cost. The Evolved Universal Terrestrial Radio Access (E-UTRA), a collaboration agreement between several countries to develop a worldwide third generation (3G) wireless communication standard, has adopted MIMO techniques. The MIMO fading channel is greatly improved when the channel state information (CSI) is available at the transmitter. Feeding back the complete CSI from receiver to transmitter, however, is daunting in terms of complexity of the communication system. An efficient feedback scheme, therefore, is crucial if the full potential of a MIMO system is to be exploited in practice. One promising candidate that provides efficient CSI feedback to the transmitter is the MIMO pre-coder feedback system.

The MIMO pre-coder feedback system fixes a common codebook comprising a set of vectors and matrices at both the transmitter and the receiver. The receiver estimates the channel between P transmit antennas and Q receive antennas. The receiver then uses this channel state information to select a codeword (a vector or a matrix) from the codebook such that a certain metric is optimized. The problem of metric selection and system optimization was addressed by Love et al., "Limited Feedback Unitary Precoding for Spatial Multiplexing Systems, IEEE Trans. on Inf. Theory, vol. 51, no. 8, pp. 2967-2976 (August 2005). Love et al. disclose criteria for selecting an optimal precoding matrix based on error rate and mutual information for different receiver designs. More recently, Zhou et al., "BER Criterion and Codebook Construction for Finite-Rate Precoded Spatial Multiplexing With Linear Receivers," IEEE Trans. on Signal Processing, vol. 54, no. 5, pp. 1653-1665 (May 2006) disclosed a bit error rate (BER) codeword selection criterion that out performs the systems disclosed by Love et al.

While the preceding approaches provide steady improvements in wireless communications, the present inventors recognize that still further improvements may be made by addressing some of the drawbacks of the prior art. In particular, the foregoing disclosures do not address either coded communications or the need for low complexity. Accordingly, the preferred embodiments described below are directed toward these benefits as well as improving upon the prior art.

BRIEF SUMMARY OF THE INVENTION

In a first preferred embodiment, a data signal is received. A codeword index is received from a remote transceiver. A codeword is selected from a Householder matrix based codebook in response to the index. The data signal is precoded in response to the selected codeword, and the precoded data stream is transmitted to the remote transceiver.

BRIEF DESCRIPTION OF THE SEVERAL VIEWS OF THE DRAWING

FIG. 7 is an exemplary 3-bit Householder codebook according to the present invention; and FIG. 8 is an exemplary 4-bit Householder codebook according to the present invention.

DETAILED DESCRIPTION OF THE INVENTION

The preferred embodiments of the present invention provide improved data rates for a wireless communication system. The wireless communication system preferably provides improved performance for the Evolved Universal Terrestrial Radio Access (E-UTRA) and Multiple-input Multiple-output (MIMO) as will be explained in detail. Transmit antennas in the following diagrams include RF amplification circuitry and other details as is understood by one of ordinary skill in the art.

Figure 1:
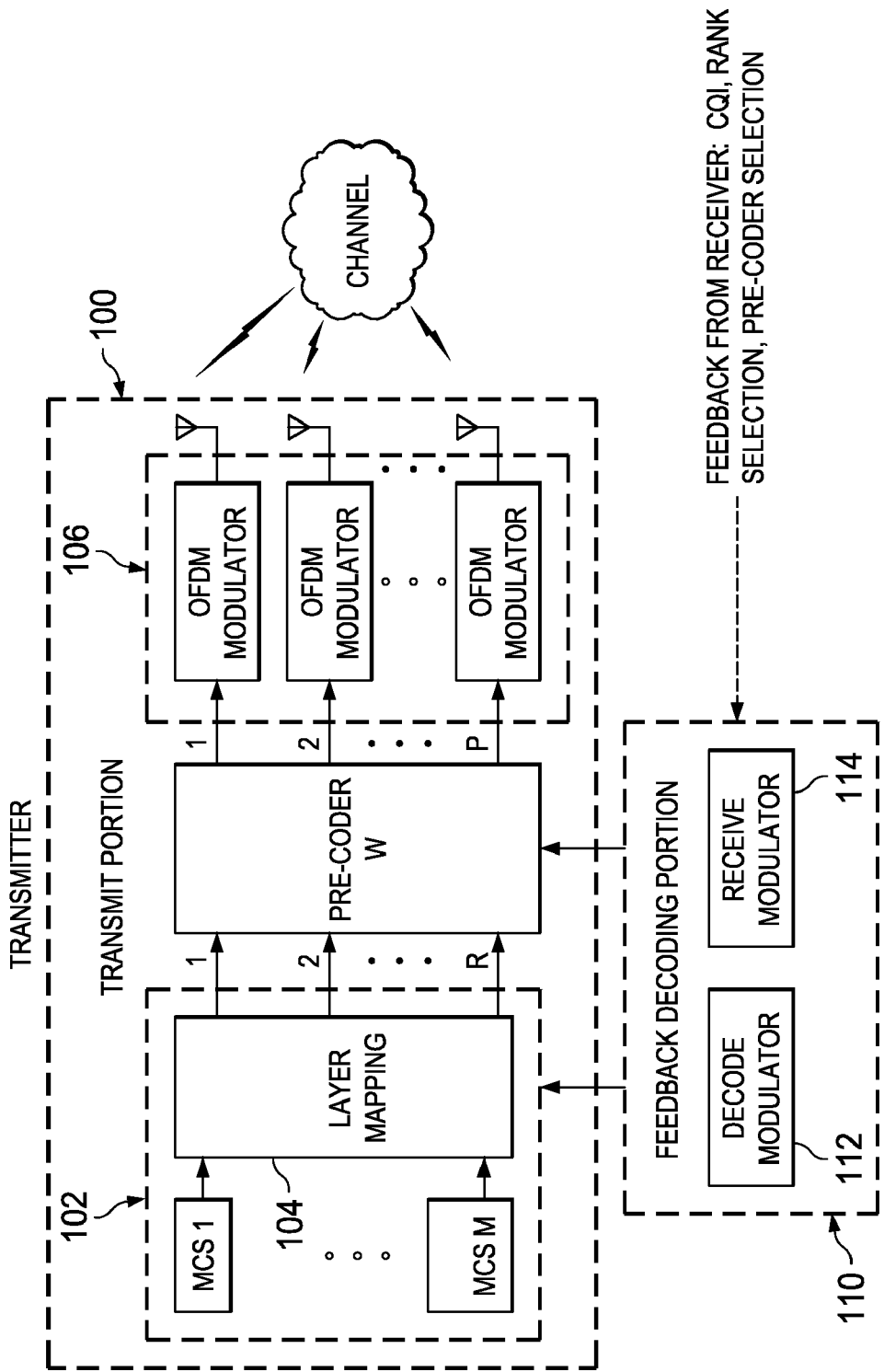
FIG. 1 is a block diagram of a transmitter of the present invention having P transmit antennas.

Referring to FIG. 1, there is a wireless transmitter of the present invention having P transmit antennas. The transmitter includes a transmit portion 100 and a feedback decoding portion 110. The transmit portion further includes encoding section 102, pre-coder 104, and OFDM modulator 106. The feedback decoding portion 110 includes a decode module 112 and a receive module 114. In operation, the encoding section 102 receives multiple data streams 1-m and applies a selected modulation coding scheme $MCS_1$-$MCS_m$ to each respective data stream. The modulation coding scheme (MCS) is selected based on channel quality between the transmitter and a remote receiver as designated by a channel quality indicator (CQI). For example, the MCS may be QPSK for low data rates and 16-QAM or 64-QAM for higher data rates and a better CQI. Based on decoded pre-coder selection feedback, one codeword, W, is selected for the pre-coder from a Householder matrix based codebook as will be explained in detail. Each data stream from $MCS_1$-$MCS_m$ is mapped to R layers to provide desired data rate for transmission. The R layers of data are then precoded with the selected codeword, W, and applied to P modulation sections of OFDM modulator 106. Each precoded data stream is then OFDM modulated and transmitted from P respective transmit antennas. Here, $R \leq P$. The number of layers R is also known as the transmission rank. Despite the availability of P antennas, transmitting only $R \leq P$ layers may be more appropriate depending on the channel condition and/or instantiation.

Figure 2:
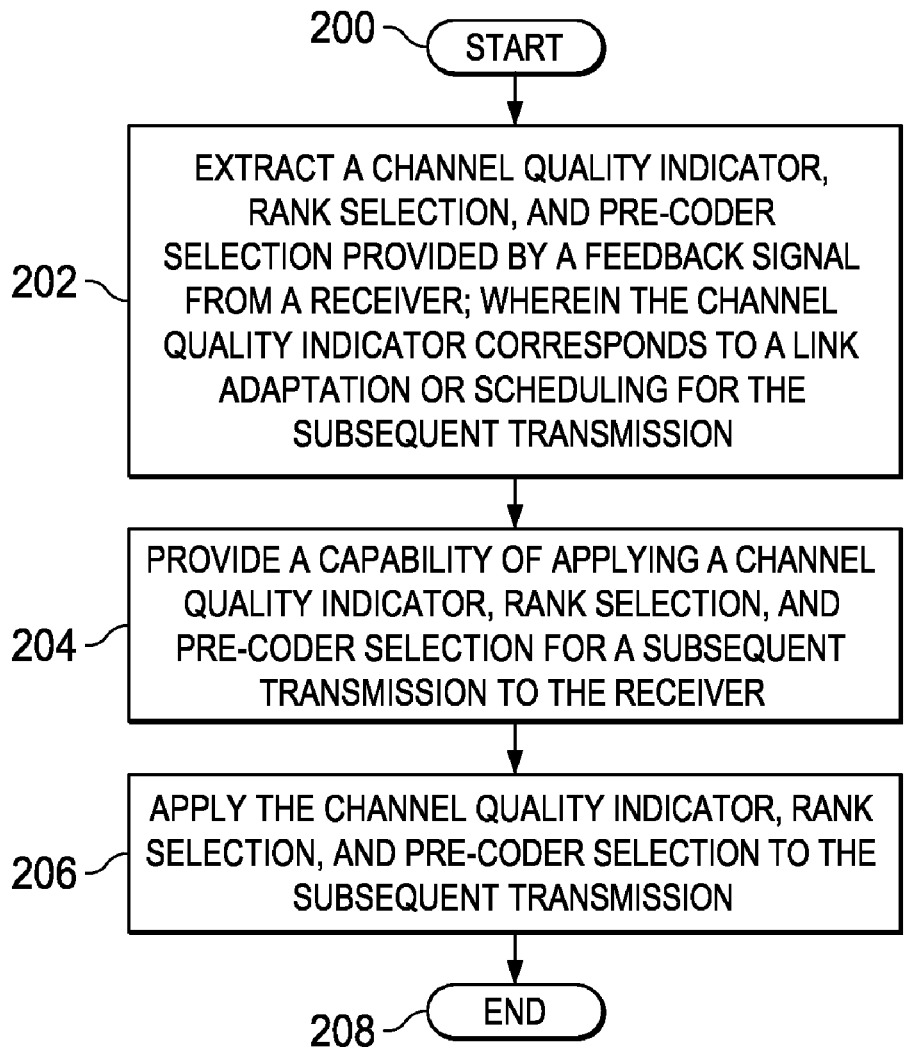
FIG. 2 is a flow chart showing operation of the pre-coder of the transmitter of FIG. 1.

Turning now to FIG. 2, there is a flow chart showing operation of the pre-coder of FIG. 1. Operation begins (200) at feedback decoding portion block 110 which preferably receives CQI, rank selection, and pre-coder selection from a remote transceiver at receive module 114. Decode module 112 decodes and extracts the CQI, rank or layer selection, and pre-coder selection at block 202. The CQI, rank selection, and pre-coder selection are applied for processing a subsequent transmission to a remote transceiver at block 204. At block 102, the CQI and rank selection are used to select one or more codewords for the m data streams $MCS_1$-$MCS_m$, followed by a layer mapping that generates R inputs to the pre-coder 104. The selected codeword or codewords W are applied to the layered data streams by pre-coder 104 at block 206. Data is subsequently transmitted from OFDM modulator 106 to the remote transceiver and the sequence ends at block 208.

Figure 3:
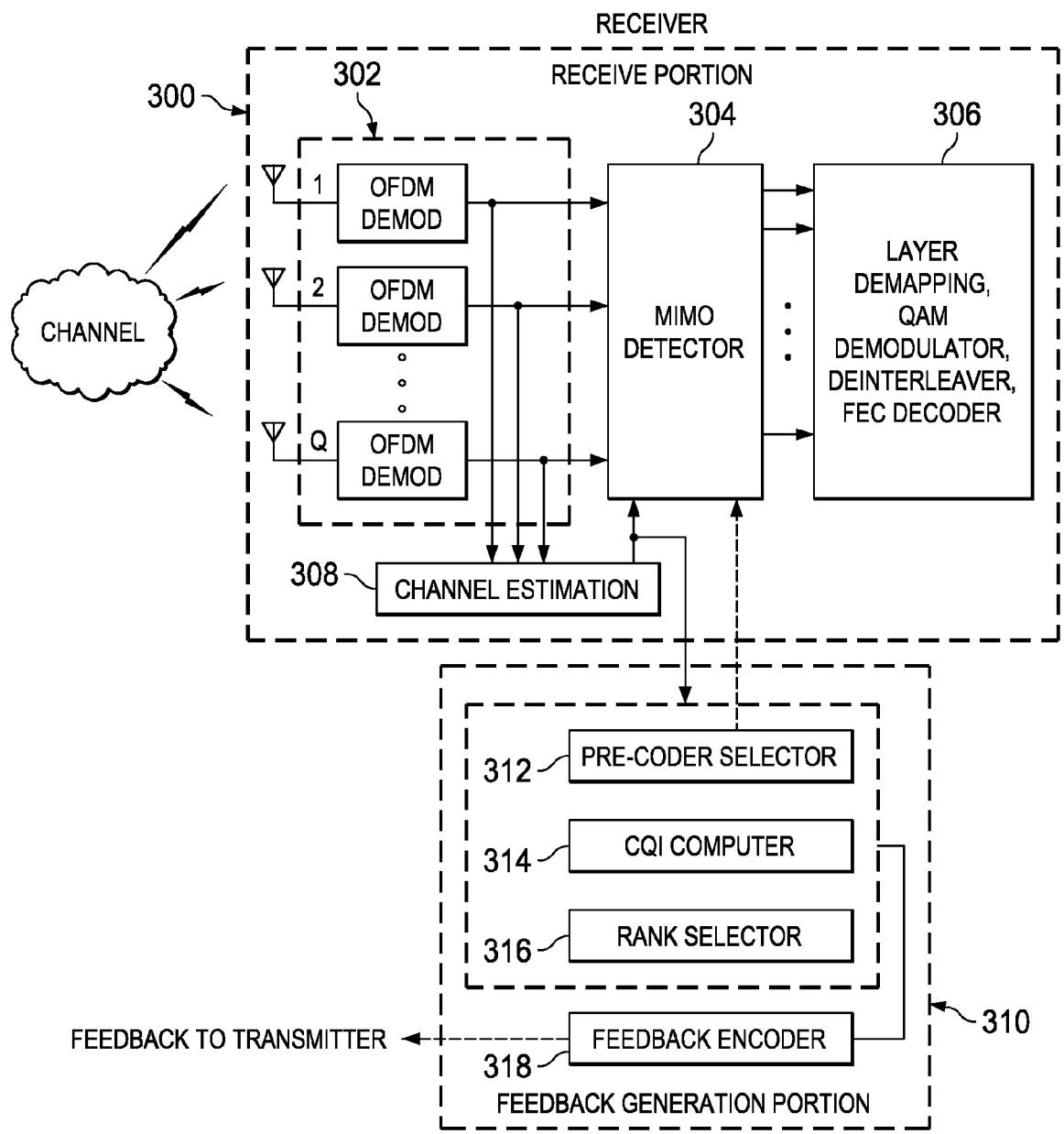
FIG. 3 is a block diagram of a receiver of the present invention having Q receive antennas.

Referring now to FIG. 3, there is a receiver of the present invention having Q receive antennas. The receiver includes a receive portion 300 and a feedback generation portion 310. The receive portion 300 includes OFDM demodulator 302, MIMO detector 304, and MCS demodulator 306. The receive portion further includes channel estimation section 308. The feedback generation portion 310 includes pre-coder selector 312, CQI computer 314, rank selector 316, and feedback encoder 318.

In operation, the OFDM demodulator 302 receives data signals from a remote transmitter and converts them to frequency domain signals by FFT as previously discussed. The signals are then applied to MIMO detector 304 to resolve the R transmitted layers from the received signal at the Q receive antennas. After layer demapping, the resolved signals are then decoded by the appropriate demodulator, deinterleaved, and forward error correction (FEC) decoded. Pilot symbols or reference signals from the OFDM demodulator 302 are applied to channel estimation block 308. The resulting channel estimation is applied to MIMO detector 304. The resulting channel estimation is also applied to feedback generation portion 310. Pre-coder selector 312 uses the channel estimate to select a pre-coder codeword from a Householder matrix based codebook to optimize a performance metric. This performance metric may be a Frame Error Rate (FER), bit error rate (BER), signal to interference plus noise ratio (SINR), instantaneous mutual information, instantaneous throughput, or other appropriate performance metric. The pre-coder selector 312 produces an index of the selected codeword for subsequent transmission to a remote transceiver. The CQI computer 314 calculates a channel quality indicator to inform the remote transceiver of the channel quality of the received signal. The rank selector 316 determines the rank or the appropriate number of layers for subsequent transmissions by the remote transceiver. Each of these parameters, the selected pre-coder/codeword index, the CQI, and the rank are applied to the feedback encoder 318 for encoding and subsequent transmission to the remote transceiver.

Figure 4:
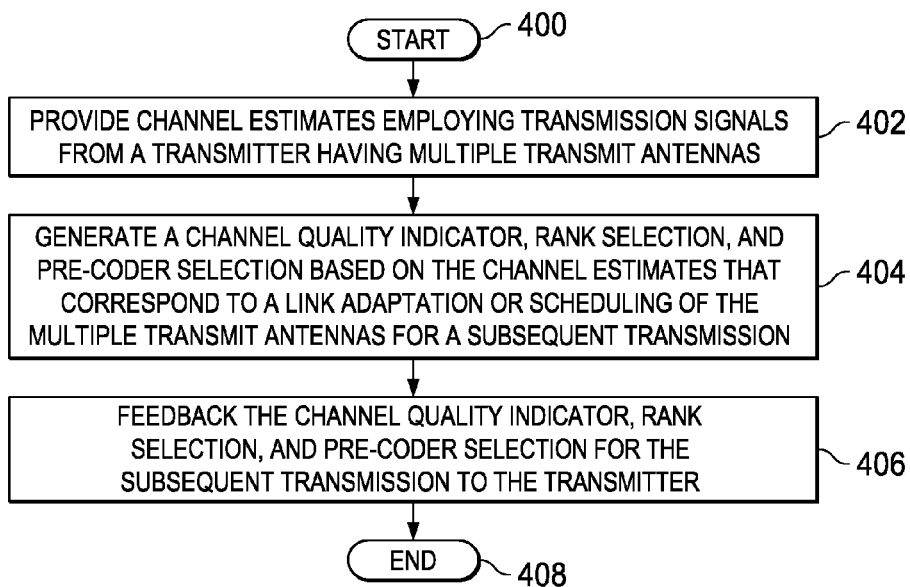
FIG. 4 is a flow chart showing operation of the pre-coder selector of the receiver of FIG. 3.

Referring now to FIG. 4, there is a flow chart showing operation of the pre-coder selector of FIG. 3. Operation begins at block 400 with the reception of OFDM modulated signals at OFDM demodulator 302. The OFDM signals are demodulated and pilot symbols are applied to channel estimation block 308. Channel estimation block 308 produces a channel estimate at block 402 in response to received signals from P transmit antennas of a remote transceiver. At block 404, in response to the channel estimate, pre-coder selector 312 selects a pre-coder codeword from a codebook. CQI computer 314 calculates a CQI, and rank selector 316 selects a transmission rank. At block 406, the CQI, and rank selection will be relayed to the remote transceiver for link adaptation or scheduling of the multiple transmit antennas for a subsequent transmission. In particular, the Householder matrix based codeword index selected in response to the channel estimates will be fed back to the remote transceiver. The cycle ends at block 408 when this transmission is complete.

For a codebook-based MIMO pre-coding scheme, the codebook should be chosen such that the finite set of codewords well represent a good quantization of the space (which is an infinite set) of all possible pre-coding matrices. It is also possible to choose the codebook to cover only a subspace of such infinite set which corresponds to a particular channel model. While a larger codebook size is beneficial in terms of performance as it represents a finer quantization of the space of all possible pre-coding matrices, codebook size is typically kept reasonably small to limit the pre-coder selection complexity at the receiver as well as to minimize the feedback overhead associated with the codeword index transmission. This makes the task of codebook design challenging. The pre-coder selection complexity can be further reduced if the codebook possesses a structure which can be exploited for additional complexity reduction. In addition, the structure can also be used to parameterize the codewords such that it allows an efficient pre-coder generation at the transmitter. While the codebook designs in the prior art may represent the aforementioned good quantization, the designs typically result in a random-like codebook which does not possess a particular structure. Hence, it does not allow additional complexity reduction and parameterization.

As an example, to perform pre-coder selection, the receiver computes a performance metric given in equation [1] for each of the codewords in the codebook.

$$\Delta(W) = [W^H H^H H W + \sigma^2 I]^{-1} \quad [1]$$

The performance metric $\Delta(W)$ represents the received SINR of a linear minimum mean square error (LMMSE) receiver as a function of the pre-coder W and the channel estimate H. For a size-N codebook, the metric is computed N times. Each metric computation involves several matrix multiplications and one matrix inversion. In addition, the pre-coder selection should be repeated for different frequency sub-bands for OFDM-based systems. It is then apparent that the pre-coder schemes of the prior art suffer from the computational complexity as they lack structure that can be exploited for reducing the computational burden of equation [1].

A major benefit of the Householder matrix based codebook of the present invention lies in the reduction of matrix multiplication complexity of the term $W^H H^H H W$. The Householder matrix can be expressed as shown in equation [2].

$$W = I_P - 2\frac{uu^H}{u^H u} = I_P - 2\frac{uu^H}{\|u\|^2} \quad [2]$$

The P×1 vector u is called the generating vector. $I_P$ is a P×P identity matrix. Alternatively, equation [2] can be simplified to equation [3] when the generating vector is of unit norm ($\|u\|=1$).

$$W = I_P - 2uu^H \quad [3]$$

As evident from equations [2] and [3], a P×P Householder matrix is fully specified and, therefore, can be parameterized by its P×1 generating vector u. Hence, a P-fold reduction in the number of parameters is obtained. Using this structure, the Householder matrix based codebook greatly simplifies computation at the remote transceiver.

As depicted in FIG. 1, different P-antenna codebooks are needed for different transmission ranks R with R∈{1, 2, . . . , P}. For R=P, the size-N codebook can be generated from N Householder matrices of size P×P corresponding to N distinct generating vectors. Each of the Householder matrices is obtained from the generating vector according to equations [2] or [3]. It is also possible to obtain additional codewords from permuting the column ordering of the Householder matrices. For R<P, each of the N codewords can be obtained from a column subset of a corresponding P×P Householder matrix. That is, R of the P columns from the Householder matrix are selected to form a P×R pre-coding matrix. Note that this entails $$\frac{P!}{(P-R)!}$$

possibilities for each codeword. In the codebook, it is also possible to include several P×R sub-matrices that are derived from the same generating vector but correspond to different column subsets.

Regarding the codebook design, different search algorithms can be implemented to generate the codebook. For the Householder based codebook, the search can be parameterized with the generating vector. When R<P, since R columns shall be selected from the available P columns of each Householder matrix, the column subset is also another search parameter associated with each codeword. Using the two parameters, a systematic search algorithm can be devised. Obviously, the exhaustive search approach is generally infeasible due to the astronomically large number of possibilities. One example of a systematic algorithm is the Greedy algorithm, where the search starts with a codeword candidate. A second codeword is selected from a set of candidates based on a certain criterion such as maximizing the minimum chordal or Fubini-Study distance. This process is then repeated where one additional codeword is added into the codebook at each iteration until the desired number of codewords is reached. The Greedy algorithm can be repeated for each of the existing codewords in the codebook to further improve the codebook. The search can be more confined if additional restrictions can be applied to the codebook and/or generating vectors. For example, constant modulus and finite alphabet restrictions can be imposed.

Figure 5A:
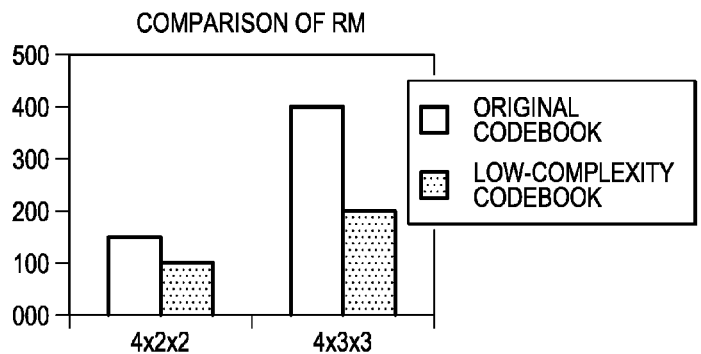
FIGS. 5A-5B are bar charts comparing complexity according to the present invention based on real multiplications and real additions, respectively.
Figure 5B:
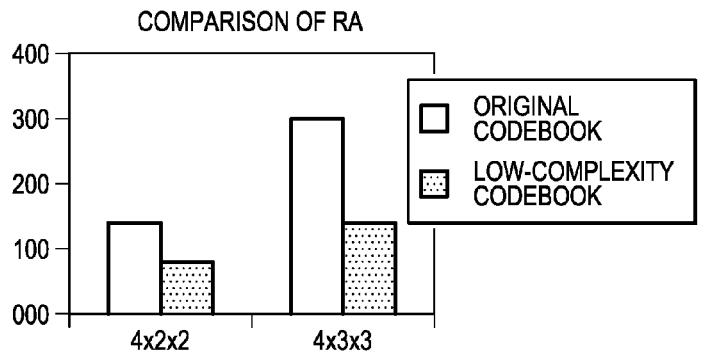

The potential complexity reduction of the Householder based codebook is demonstrated as follows. For a 4×2×2 system having 4 transmit antennas, 2 receive antennas, and 2 data streams applied to MCS blocks 102, respectively, there are only three matrix vector computations. All other computations are scalar complex multiplication and addition. Referring to FIGS. 5A and 5B there are bar charts comparing the complexity of the codebook of Zhou et al. with the Householder matrix based codebook of the present invention. FIG. 5A is a comparison of real multiplication operations. The 4×2×2 system reveals a 40% reduction according to the present invention. The 4×3×3 system shows a 50% reduction in real multiplications. Real addition complexity is reduced even more as shown at FIG. 5B. The 4×2×2 system reveals a 45% reduction according to the present invention. The 4×3×3 system shows a 63% reduction in real additions.

Figure 6A:
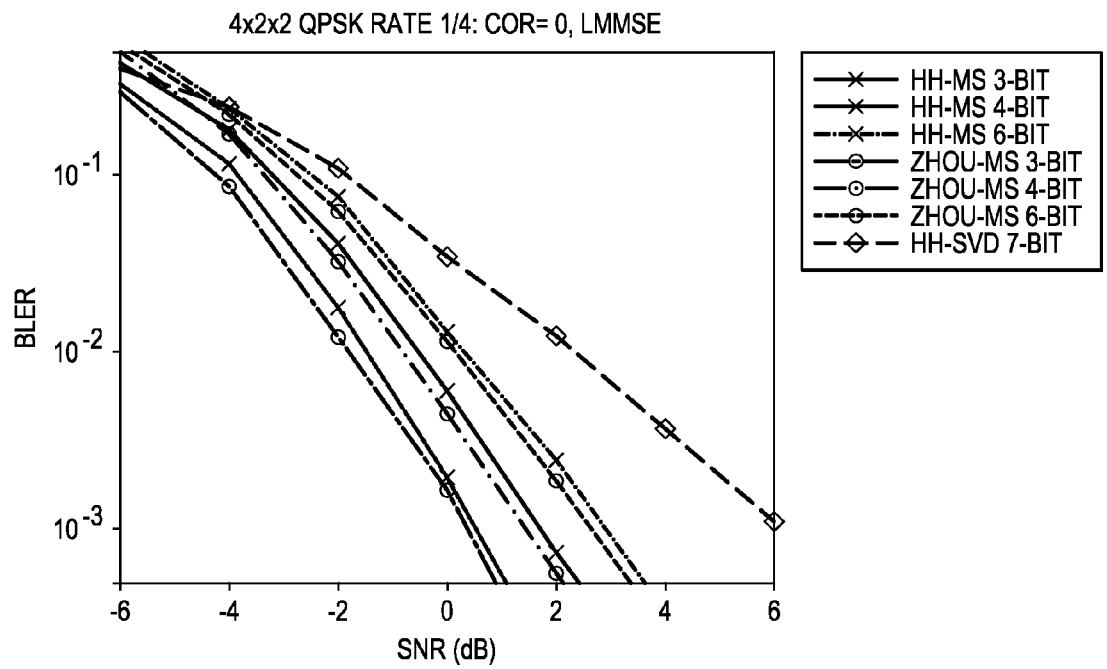
FIGS. 6A-6B are simulation results of block error rate (BLER) as a function of signal-to-noise (SNR) ratio.
Figure 6B:
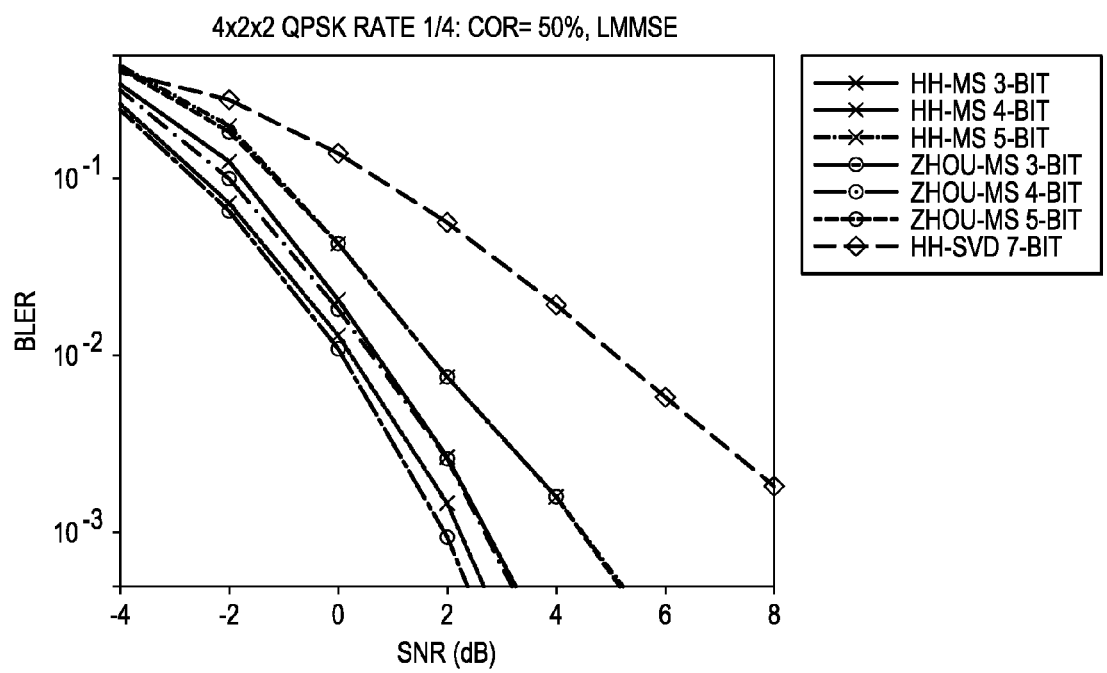

Referring now to FIGS. 6A-6B, there are simulation results of block error rate (BLER) as a function of signal-to-noise (SNR) ratio. Both simulations assume a QPSK MCS with ¼ code rate. The simulation of FIG. 6A assumes no spatial correlation at the base station or mobile transceiver. The simulation of FIG. 6B assumes 50% spatial correlation at the base station or mobile transceiver. FIG. 6A compares 3-, 4-, and 6-bit Householder matrix based codebooks (HH-MS) to corresponding 3-, 4-, and 6-bit codebooks of Zhou et al. Here, MS indicates metric-based pre-coder selection. The codebook of Zhou et al. slightly outperforms the previously disclosed codebook of Love et al. It is designed using a "random-like" search using Lloyd's algorithm and, therefore, represents a near optimal benchmark. Both Zhou et al. and the present invention are also compared to 7-bit singular value decomposition (SVD) of the channel matrix. Several noteworthy conclusions are evident from the simulations. First, the 4-bit HH-MS scheme consistently outperforms the 7-bit HH-SVD scheme. Second, the performance difference between the well-structured HH-MS codebook of the present invention and the Zhou-MS codebook is negligible. Third, all versions of the HH-MS codebook provide a significant reduction in pre-coder selection complexity over the Zhou-MS codebook.

Referring now to FIGS. 7-8, exemplary Householder matrix based codebooks are reproduced for 3-bit and 4-bit codebooks respectively. Both assume 4 transmit antennas, N receive antennas, and transmission rank 2 at respective MCS blocks.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method of transmitting a communication signal, comprising the steps of:
   receiving a data signal;
   receiving a codeword index from a remote transceiver;
   selecting a codeword from a Householder matrix based codebook in response to the index;
   pre-coding the data signal in response to the selected codeword; and
   transmitting the precoded data signal.

2. A method as in claim 1, wherein the Householder matrix comprises the form $$W = I - 2\frac{uu^H}{\|u\|^2},$$

wherein u is a unit vector, W is a codeword, H is a channel estimate, I is a matrix.

3. A method as in claim 1, wherein the codebook comprises a plurality of Householder matrices.

4. A method as in claim 1, wherein the codeword is a sub-matrix of a Householder matrix.

5. A method as in claim 1, comprising the step of orthogonal frequency division modulating the precoded data signal prior to the step of transmitting.

6. A method as in claim 1, wherein the step of transmitting comprises transmitting from a plurality of transmit antennas.

7. A method as in claim 1, wherein the remote transmitter includes a copy of the Householder matrix based codebook.

8. A method of transmitting a communication signal, comprising the steps of:
   receiving a data signal;
   receiving a codeword index from a remote transceiver;
   selecting a codeword from a Householder matrix based codebook in response to the index, wherein the Householder matrix comprises the form $W=I-2uu^H$, wherein u is a unit vector, W is a codeword, H is a channel estimate, I is a matrix;
   pre-coding the data signal in response to the selected codeword; and
   transmitting the precoded data signal.

9. A method of transmitting a communication signal, comprising the steps of:
   receiving a data signal;
   receiving a codeword index from a remote transceiver;
   receiving a rank selection from the remote transceiver;
   selecting a codeword from a Householder matrix based codebook in response to the index and the rank selection;
   pre-coding the data signal in response to the selected codeword; and
   transmitting the precoded data signal.

10. A transmitter, comprising:
    a decode circuit coupled to receive an input signal from a remote transceiver and produce a codeword index;
    a select circuit coupled to receive the codeword index, the select circuit selecting a codeword from a Householder matrix based codebook in response to the codeword index;
    a pre-coder circuit coupled to receive a data signal and the codeword, the pre-coder circuit arranged to pre-code the data signal; and
    a modulator circuit arranged to modulate the pre-coded data signal.

11. A transmitter as in claim 10, wherein the Householder matrix comprises the form $$W = I - 2\frac{uu^H}{\|u\|^2},$$

wherein u is a unit vector, W is a codeword, H is a channel estimate, I is a matrix.

12. A transmitter as in claim 10, wherein the codeword is a Householder matrix.

13. A transmitter as in claim 10, wherein the selected codeword is a sub-matrix of a Householder matrix.

14. A transmitter as in claim 10, wherein the modulator circuit is an orthogonal frequency division modulator (OFOM).

15. A transmitter as in claim 10, comprising a plurality of transmit antennas.

16. A transmitter as in claim 10, wherein the remote transmitter includes a copy of the Householder matrix based codebook.

17. A transmitter, comprising:
a decode circuit coupled to receive an input signal from a remote transceiver and produce a codeword index and a rank selection from the input signal;
a select circuit coupled to receive the codeword index, the select circuit selecting a codeword from a Householder matrix based codebook in response to the codeword index and the rank selection;
a pre-coder circuit coupled to receive a data signal and the codeword, the pre-coder circuit arranged to pre-code the data signal; and
a modulator circuit arranged to modulate the pre-coded data signal.

18. A method of receiving a communication signal, comprising the steps of:
receiving a signal from a remote transceiver;
selecting a codeword from a Householder matrix based codebook in response to a performance metric; and
transmitting an index of the selected codeword to the remote transmitter.

19. A method as in claim 18, wherein the Householder matrix comprises the form $$W = I - 2\frac{uu^H}{\|u\|^2},$$

wherein u is a unit vector, W is a codeword, H is a channel estimate, I is a matrix.

20. A method as in claim 18, wherein the selected codeword is a Householder matrix.

21. A method as in claim 18, wherein the selected codeword is a sub-matrix of a Householder matrix.

22. A method as in claim 18, wherein the received signal comprises an orthogonal frequency division multiplex (OFDM) signal.

23. A method as in claim 18, wherein the step of receiving comprises receiving from a plurality of receive antennas.

24. A method as in claim 18, wherein the remote transceiver includes a copy of the Householder matrix based codebook.

25. A method of receiving a communication signal, comprising the steps of:
receiving a signal from a remote transceiver:
selecting a codeword from a Householder matrix based codebook in response to a performance metric, wherein the Householder matrix comprises the form $W=I_N-2uu^H$, wherein u is a unit vector, W is a codeword, H is a channel estimate, I is a matrix: and
transmitting an index of the selected codeword to the remote transmitter.

26. A method of receiving a communication signal, comprising the steps of:
receiving a signal from a remote transceiver;
selecting a codeword from a Householder matrix based codebook in response to a performance metric;
selecting a rank; and
transmitting an index of the selected codeword and the rank to the remote transceiver.

27. A receiver, comprising:
an input circuit coupled to receive an input signal from a remote transceiver and produce a performance metric;
a select circuit coupled to receive the performance metric, the select circuit selecting a codeword from a Householder matrix based codebook in response to the performance metric; and
an output circuit arranged to transmit an index of the selected codeword to the remote transceiver.

28. A receiver as in claim 27, wherein the selected codeword is a Householder matrix.

29. A receiver as in claim 27, wherein the selected codeword is a sub-matrix of a Householder matrix.

30. A receiver as in claim 27, wherein the selected codeword is a sub-matrix of a Householder matrix.

31. A receiver as in claim 27, wherein the input signal comprises an orthogonal frequency division multiplex (OFDM) signal.

32. A receiver as in claim 27, comprising a plurality of receive antennas.

33. A receiver as in claim 27, wherein the remote transceiver includes a copy of the Householder matrix based codebook.

34. A receiver, comprising:
an input circuit coupled to receive an input signal from a remote transceiver and produce a performance metric:
a select circuit coupled to receive the performance metric, the select circuit selecting a codeword from a Householder matrix based codebook in response to the performance metric, wherein the Householder matrix comprises the form $$W = I - 2\frac{uu^H}{\|u\|^2},$$

wherein u is a unit vector, W is a codeword, H is a channel estimate, I is a matrix: and
an output circuit arranged to transmit an index of the selected codeword to the remote transceiver.

35. A receiver, comprising:
an input circuit coupled to receive an input signal from a remote transceiver and produce a performance metric:
a select circuit coupled to receive the performance metric, the select circuit further selects a codeword from a Householder matrix based codebook and a rank in response to the performance metric; and
an output circuit arranged to transmits an index of the selected codeword and the rank to the remote transceiver.

* * * * *